(12) United States Patent
Sashihara

(10) Patent No.: US 6,449,357 B1
(45) Date of Patent: Sep. 10, 2002

(54) QUEUING STATUS REPORTING APPARATUS

(75) Inventor: Toshiyuki Sashihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/332,991

(22) Filed: Jun. 15, 1999

(30) Foreign Application Priority Data

Jun. 17, 1998 (JP) .......................................... 10-169461

(51) Int. Cl.$^7$ ................................................ H04M 3/00
(52) U.S. Cl. ........................... 379/265.09; 379/266.01; 379/309; 379/88.15
(58) Field of Search ....................... 379/265.03, 265.01, 379/265.09, 266.01, 309, 88.15, 67.1

(56) References Cited

U.S. PATENT DOCUMENTS

| | | | |
|---|---|---|---|
| 5,181,236 A | * | 1/1993 | Lavallee et al. ........ 379/142 X |
| 5,185,782 A | * | 2/1993 | Srinivasan .............. 379/214 X |
| 5,479,491 A | * | 12/1995 | Herrero-Garcia et al. .................. 379/100.08 X |
| 5,594,791 A | * | 1/1997 | Szlam et al. ................. 379/265 |
| 5,933,492 A | * | 8/1999 | Turouski ................. 379/309 X |
| 5,963,635 A | * | 10/1999 | Szlam et al. ............ 379/266 X |

FOREIGN PATENT DOCUMENTS

| | | |
|---|---|---|
| JP | 62-95057 | 5/1987 |
| JP | 2-52561 | 2/1990 |
| JP | 5-175895 | 7/1993 |
| JP | 7-66891 | 3/1995 |
| JP | 7-240796 | 9/1995 |
| JP | 7-250186 | 9/1995 |

* cited by examiner

*Primary Examiner*—Creigton Smith
(74) *Attorney, Agent, or Firm*—Sughrue Mion, PLLC

(57) ABSTRACT

A queuing status reporting apparatus delivers a report tailored to the type of a remote contact device being specified by a call-reserving user. If the contact device is a paging receiver, a report is. sent in a word phrase while if the contact device is a telephone, a report is sent in a voice phrase. The apparatus includes a user data memory for storing a pager receiver number or a telephone number as a contact number relating to each user, and a call-timing as a schedule for contacting the call-reserving user; a reporting control device connected to the user data memory for searching through call-timing data to detect a call-due user, and if a call-due user is found, to access a relevant contact number from the user data memory, and to decide whether a detected contact number is a paging receiver number or a telephone number, so that, when the contact number detected by the reporting control device is a paging receiver (or a telephone device), a pager contact device (or a phone contact device 42 sends a word-report (or a voice-report).

9 Claims, 12 Drawing Sheets

FIG.2

QUEUING NUMBER

CONTACT NUMBER

WE CALL YOU WHEN THE NUMBER OF PERSONS AHEAD OF YOU BECOMES ? ▢ PERSONS

| 1 | 2 | 3 | 4 | 5 | 6 | 7 | 8 | 9 | 0 | OK |

FIG.5

ADMISSION TICKET

WHEN RESERVING A CALL SERVICE, PLEASE ENTER A CONTACT PHONE NUMBER 0 8 0 1 1 1 2 2 2 2

| 1 | 2 | 3 |
| 4 | 5 | 6 |
| 7 | 8 | 9 |
| * | 0 | # |

| ADULT ¥500 | CHILD ¥250 |

QUEUING STATUS REPORTING APPARATUS

BACKGROUND OF THE INVENTION

1. Field of the Invention

The present invention relates to an apparatus for reporting the status of a queue line to remote persons-in-queue, through a personal contact device specified by each person, such as a paging receiver (pager), a cell phone, a digital phone (Personal Handy-phone System) or a wired network telephone.

This application is based on Japanese Patent Application No. Hei 10-169461, the contents of which are incorporated herein by reference.

2. Description of the Related Art Including Information Disclosed under 37 CFR 1.97 and 1.98

The type of queuing reporting apparatus described in the present invention is generally found at a service desk, and is used to contact remote persons, waiting to be served but are currently away from the service desk.

For example, Japanese Patent Application, First Publication, Sho 63-86096 discloses a wireless method of notifying a waiting person that the system is ready to serve the person.

This queuing reporting system will be explained with reference to FIG. 13. In this method, the service desk distributes a portable receiver unit having an ID code (identification code) particular to each unit to each waiting person so that when the service becomes available to a certain waiting person, the service desk transmits a signal carrying an ID code assigned to the unit held by certain waiting person.

When a call signal with the ID code is transmitted for the particular waiting person who is ready to be served, the receiver unit having the ID code accepts the call signal, and the receiver unit activates a buzzer.

However, this method of contacting a waiting person is based on receiver units responsive to a particular transmitter, and it is necessary to have on hand a suitable number of dedicated receiver units that respond to the transmitter. Therefore, for a service desk dealing with many customers, such as a busy store front, it is necessary to stock a fairly large number of transmitters, resulting in a high capital cost. Furthermore, because the transmitter operates on a privately owned frequency, it is necessary for the sender to have a broadcasting license. Additionally, such private signal transmitters are restricted to a low delivery power so that the receivers (customers) are required to remain within the range of signal delivery capability of the transmitter.

It is sometimes unavoidable for a waiting person to cancel or postpone a queue spot, after having reserved a place in a queue line. In such a case, the queuing monitoring system must have a capability to deal with cancellation or re-scheduling requests.

However, Japanese Patent Application, Sho 63-86096 does neither mention such possibilities, nor provide any suggestions for dealing with cancellation or re-scheduling requests.

Another Japanese Patent Application, First Publication, Hei 7-66891, discloses a queuing system in which the service desk reports the latest progress in the queuing status by contacting individual telephones or paging receivers that are registered with the service desk.

However, Japanese Patent Application, First Publication, Hei 7-66891 does not mention that, when the customer's unit is a telephone, it is necessary to deliver the message as voice signals, but when the customer's unit is a paging receiver, it is necessary to deliver the message as data signals, and, furthermore, that it is necessary for the transmitter to determine whether the message should be in voice signals or data signals on the basis of the ID codes of the receiver units, and be able to switch between the two modes of communication. Such complexities are not mentioned at all in Japanese Patent Application, First Publication, Hei 7-66891.

As well, Japanese Patent Application, First Publication, Hei 7-66891 does not mention that cancellations or re-scheduling are unavoidable in practice, and that a reporting system should be capable of processing cancellations and re-scheduling. The lack of such a capability would be fatal to proper functioning of banks.

Further, Japanese Patent Applications, First Publications, Sho 62-95057, Hei 7240796, and Hei 7-250186 disclose a reporting device for delivering a report to a user by contacting individual telephones, which is not able to switch between the two modes of voice and data communication and to handle cancellations or re-scheduling.

SUMMARY OF THE INVENTION

It is an object of the present invention to provide an apparatus to contact a call-reserving user to report that a service will soon be available, by calling a paging receiver (pager) or a telephone device (including cell phones, digital phones and wired network phones) belonging to the call-reserving user so that if the receiving unit is a paging receiver, a word-report is delivered while the receiving unit is a telephone device, a voice-report if delivered.

It is another object of the present invention that the apparatus includes a function to accept a cancellation or postponement request.

These objects have been achieved in a queuing status reporting apparatus for reporting that a service will soon be available to a call-reserving user holding a queuing ticket in a queuing line, by calling a paging receiver or a telephone device specified by the call-reserving user, comprising: a user data memory for storing a paging receiver number or a telephone number as a contact number relating to each call-reserving user, and a call-timing as a schedule for contacting each call-reserving user; a reporting control device connected to the user data memory for searching through call-timing data to detect a call-due user, and if a call-due user is found, to access a relevant contact number from the user data memory, and to decide whether the relevant contact number is a paging receiver number or a telephone number; a pager contact device connected to the reporting control device for sending a word-report to a pager receiver, when the relevant contact number obtained by the reporting control device is judged to be a paging receiver; and a phone contact device connected to the reporting control device for sending a voice-report to a telephone device, when the detected contact number obtained by the reporting control device is judged to be a telephone device.

Accordingly, the present queuing status reporting apparatus eliminates the need for an organization to provide special-purpose signal receivers for its customers, thereby overcoming a serious disadvantage in the existing wireless reporting methods requiring dedicated signal receivers to be distributed to each customer. The present reporting apparatus significantly reduces economic burden on the organization, because reporting is carried out by using public access phone systems, such as cell phones, PHS phones or fixed phones so that there is no need for providing special-purpose receivers to each customer.

Furthermore, the present reporting apparatus is extremely versatile because a report is delivered in word phrases when the destination receiver is a paging receiver or other similar devices while for telephone devices, a report is delivered in voice phrases.

Also, the present reporting apparatus offers additional capabilities of processing cancellation or postponement requests that have not been available to date.

BRIEF DESCRIPTION OF THE DRAWINGS

FIG. 2 is an illustration of a user data input section of the queuing status reporting apparatus shown in FIG. 1.

FIG. 5 is an illustration of a ticketing device for the queuing status reporting apparatus shown in FIG. 4.

DESCRIPTION OF THE PREFERRED EMBODIMENTS

Embodiment 1

Figure 1:
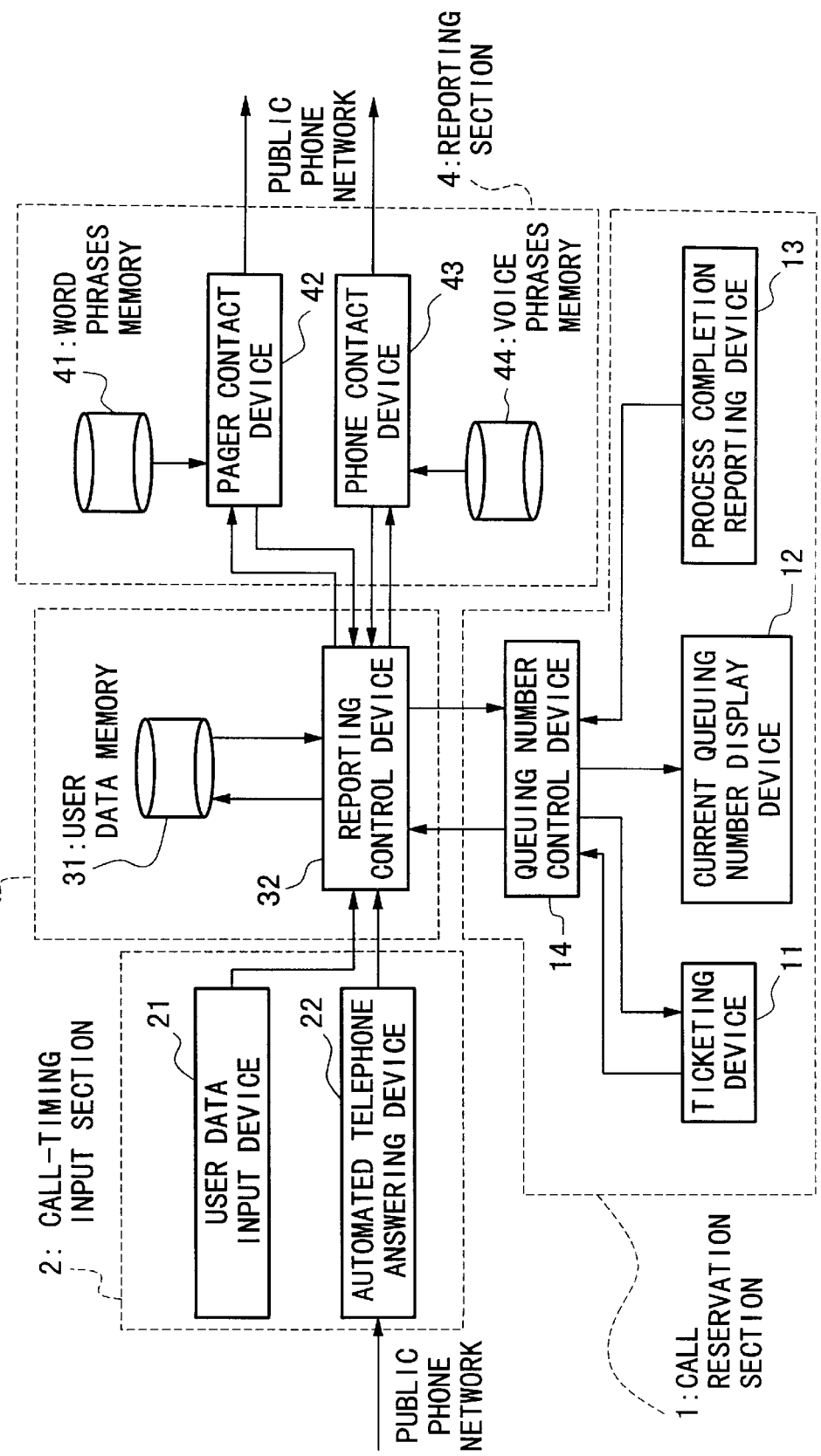
FIG. 1 is a block diagram of a first embodiment of the queuing status reporting apparatus of the present invention.

FIG. 1 shows a block diagram of a first embodiment of the queuing status reporting apparatus to notify a cell phone or a paging receiver (pager) belonging to a person-in-queue.

The person-in-queue who holds a queuing ticket issued by a ticketing device 11 enters user data, such as a queuing number, a contact number for a cell phone/PHS phone/fixed network phone or a paging receiver, and a desired call-timing. The user data are stored in the user data memory 31. A reporting control device 32 searches for a call-due user (person-in-queue who is due to be contacted) by going through the queue data in the user data memory 31. When a call-due user is found, the reporting control device 32 notifies through a public telephone circuit that the specified call-timing has arrived. Before contacting the call-due user, the apparatus decides whether the user device is a paging receiver or a cell phone/PHS phone/fixed network phone on the basis of the contact number, and if it is a paging receiver, the report is sent in data signals (in text data signals) from a pager contact device 42 and if it is one of the phone devices, the report is sent in voice signals from a phone contact device (cell phone/PHS phone/fixed network phone reporting device) 43.

The queuing status reporting apparatus will be explained in further detail with reference to FIG. 1. The apparatus is comprised by: a call reservation section 1; a call-timing input section 2; a reporting control section 3; and a reporting section 4. The call reservation section 1 is comprised by: a ticketing device 11, a current queuing number display device 12; a process completion reporting device 13; and a queuing number control device 14. The queuing number control device 14 is connected to each of the ticketing device 11, current queuing number display device 12, process completion reporting device 13, and reporting control device 32. The queuing number control device 14 includes a counter to memorize a current queuing number being issued as well as a list of queuing numbers (referred to as the waiting list hereinbelow), and forwards the current queuing number to the reporting control device 32, and accepts changes to be made in the waiting list from the reporting control device 32. The ticketing device 11 performs the tasks of issuing tickets and displaying the number of persons-in-queue, and when a ticket is issued, forwards a ticket-issued signal to the queuing number control device 14, and receives a next queuing number to be issued and the number of persons-in-queue from the queuing number control device 14. It is permissible to provide a plurality of ticketing devices 11. The current queuing number display device 12 receives a queuing number currently being issued by the queuing number control device 14, and displays this number. It is also permissible to provide a plurality of current queuing number display devices. The process completion reporting device 13 is a press switch to be pressed by a service person when a processing task for one user is completed, and the user data are forwarded to the queuing number control device 14. It is also permissible to provide a plurality of process completion devices 13.

The call-timing input section 2 is comprised by a user data input device 21 and an automated telephone answering device 22. The user data input device 21 performs a task of accepting reservations for queuing reports for users by a terminal shown in FIG. 2, and provides input user data (such as queuing number, contact number, and call-timing) to the reporting control device 32. It is permissible to provide a plurality of user data input devices 21. Also, the automated telephone answering device 22 performs such tasks as processing of telephone reservations for queuing reports, canceling or postponing requests made by the reserving users, and provides the input user data (such as queuing number, contact number, and call-timing) and/or canceling or postponing requests to the reporting control device 32. It is also permissible to provide a plurality of automated telephone answering devices.

The reporting control section 3 is comprised by a user data memory 31 and a reporting control device 32. The reporting control device 32 is connected to each of the user data input device 21, automated phone answering device 22, queuing number control device 14, pager contact device 42, phone contact device 43, and user data memory 31. The reporting control device 32 stores the data received from the user data input device 21 and the automated phone answering device 22 in the user data memory 31, and receives current queuing numbers forwarded from the queuing number control device 14, and searches in the user data memory 31 for call-due users. When a call-due user is found, the apparatus decides from the contact number whether the destination device is a paging receiver or a cell phone/PHS phone/fixed network phone, and if it is a paging receiver, the report is sent in data signals from a pager contact device 42 and if it is one of the phone devices, the report is sent in voice signals from a phone contact device 43. When a cancel request is received by the reporting control device 32 from the automated phone answering device 22, the reporting control device 32 sends a request to delete the canceled queuing number from the waiting list to the queuing number control device 14. Also, when the reporting control device 32 receives a request for postponing from the automated phone answering device 22, the reporting control device 32 requests the queuing number control device 14 to shift the contact number of the queuing ticket to be shifted down into the future by an amount equal to the requested shift.

The reporting section 4 is comprised by: a word phrases memory 41; a pager contact device 42; a phone contact device 43 (a cell phone/PHS phone/fixed network phone contact device); and a voice phrases memory 44. The pager contact device 42 transmits a word phrase selected from the word phrases memory 41 to the contact number specified by the reporting control device 32. When reporting is completed, the reporting control device 32 is so notified. The phone contact device 43 telephones the contact number specified by the reporting control device 32, and notifies the user by selecting a voice phrase from the voice phrases memory 44. If a contact cannot be established, the reporting control device 32 is so notified, which makes periodic calls by dialing the contact number until a report can be delivered to the user.

Operation of Embodiment 1

In the following, the operation of the first embodiment apparatus will be described with reference to FIG. 1.

Those users (call-reserving users) receiving a queuing ticket from the ticketing device 11 and wishing to be contacted by the call service will enter own user data such as a queuing number, a contact number and a desired call-timing by phoning the automated phone answering device 11 or using the key pad of the user data input device 21. Data entering method can be based on a touch-tone phone system or a voice recognition system. The desired time to call a reserving user (call-timing) is specified by stating the number of persons in the queue line who remain ahead of the reserving user. User data input in the ticketing device 11 are sent to the reporting control device 32, which stores the data in the user data memory 31.

The reporting control device 32 receives successive current queuing numbers that are input in the queuing number control device 14, and constantly monitors the content of the user data memory 31 to find call-due users. When a person to be contacted is found, the reporting control device 32 determines from the contact number whether the user is to be contacted on a paging receiver or one of the phone devices (cell phone/PHS phone/fixed network phone), and a report is transmitted to the relevant destination device.

When the destination device is a paging receiver, the contact number is sent to the pager contact device 42, which delivers an appropriate word phrase stored in the word phrases memory 41 to the destination paging receiver. The word phrases memory contains different model phrases such as "This is bank B. Your reserved time is approaching", and allows a selection of a phrase suitable to the occasion. Additional messages such as "If canceling a reservation, please call this number N1." or "If you wish to postpone a queue spot by one hour, please call this number N2." will provide flexibility to the service system. Such messages can be handled totally by the automated phone answering device 22. When the message transmission is completed, the reporting control device 32 is so notified, which deletes the user data (such as queuing number, contact number, and call-timing) of a relevant reserving user from the user data memory 31.

Next, when the destination device is a phone device (cell phone/PHS phone/fixed network phone), the contact number is forwarded to the phone reporting device 43, which telephones the contact number, and when a connection is established, an appropriate voice phrase stored in the voice phrases memory 44 is delivered. In this case also, there are many voice phrases stored in the memory so that a voice phrase can be selected to suit the occasion. It would also be possible to transmit voice phrases such as "If canceling a reservation, please call this number N1." or "If you wish to postpone a queue spot by one hour, please call this number N2.". When voice reporting is completed, the reporting control device 32 is so notified, which deletes the user data (such as queuing number, contact number, and call-timing) of a relevant reserving user from the user data memory 31. If the destination device is busy or out of the contact range, the reporting control device 32 is notified that the contact could not be established. The reporting control device 32 tries to reconnect by calling again after a lapse of, say, 30 seconds.

Requests for canceling or postponing a queue spot are received by the automated phone answering device 22. When such a request is received, the automated phone answering device 22 so notifies the reporting control device 32. If the request is a cancellation, the reporting control device 32 deletes the relevant user data from the user data memory 31, and requests the queuing number control device 14 to delete the queuing number of the relevant user from the waiting list. If the request is a postponing of a queue spot, the user queuing sequence is shifted to comply with the request, and a newly scheduled time is entered to replace the old schedule in the user data memory 31, and the queuing number control device 14 is also so notified.

Embodiment 2

Figure 3:
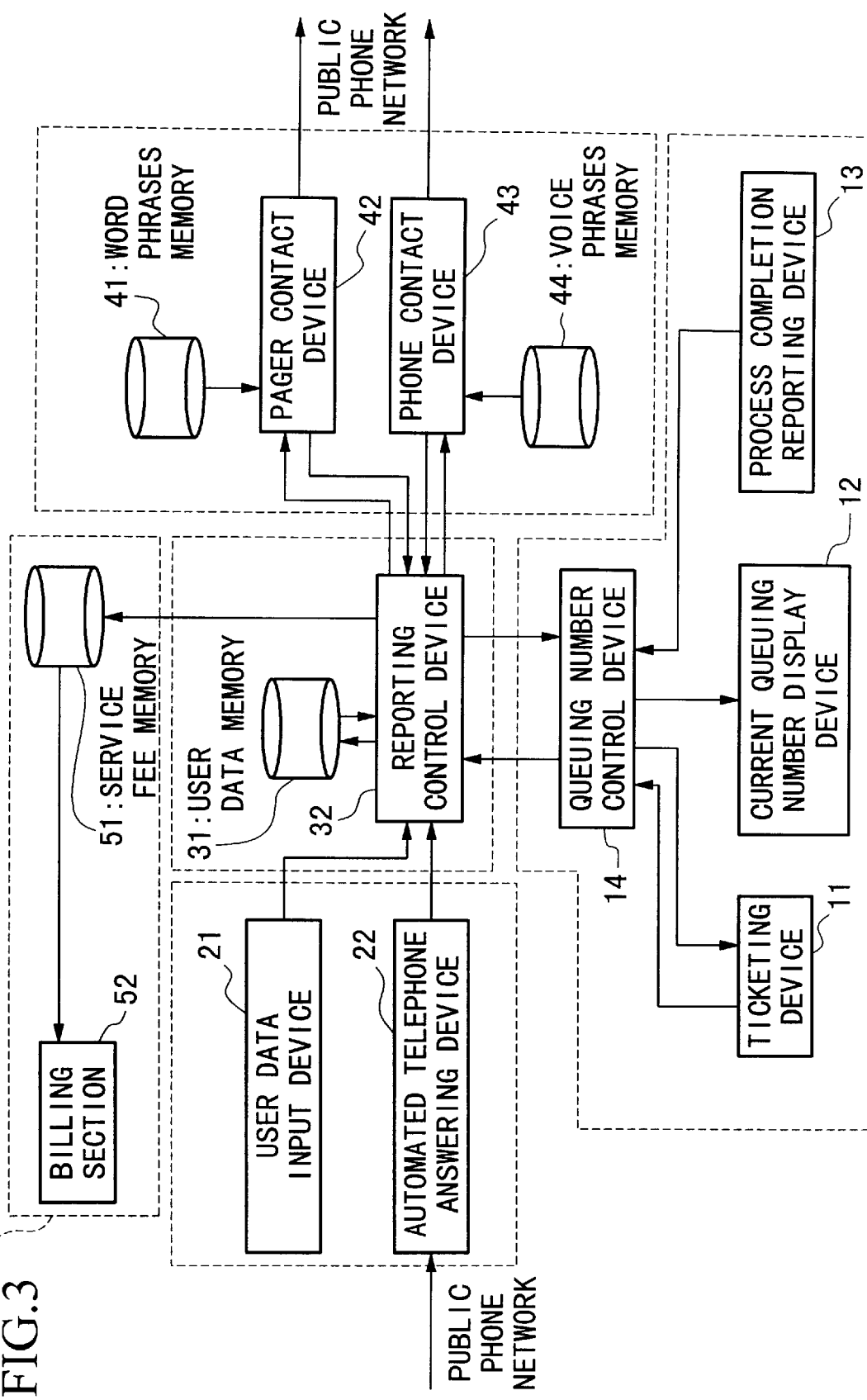
FIG. 3 is a block diagram of a second embodiment of the queuing status reporting apparatus of the present invention.

A second embodiment of the queuing status reporting apparatus will be presented with reference to FIG. 3. This apparatus is substantially the same as the apparatus in the first embodiment shown in FIG. 1 except for a service fee memory 51 and a billing device 52 in a billing section 5.

Upon successful completion of a reporting process based on the pager contact device 42 or the phone contact device 43, the user name and a fee appropriate to the service rendered are entered in the service fee memory 51. The billing device 52 carries out appropriate account transactions by accessing the fee data stored in the service fee memory 51.

Additions of the service fee memory 51 and the billing section enable to provide queuing status reporting service as a fee-based-service. Other method of billing can be used so that the fees may be collected through the communication providers of paging receivers, cell phones, PHS phones and wired (fixed) network phones.

Embodiment 3

Figure 4:
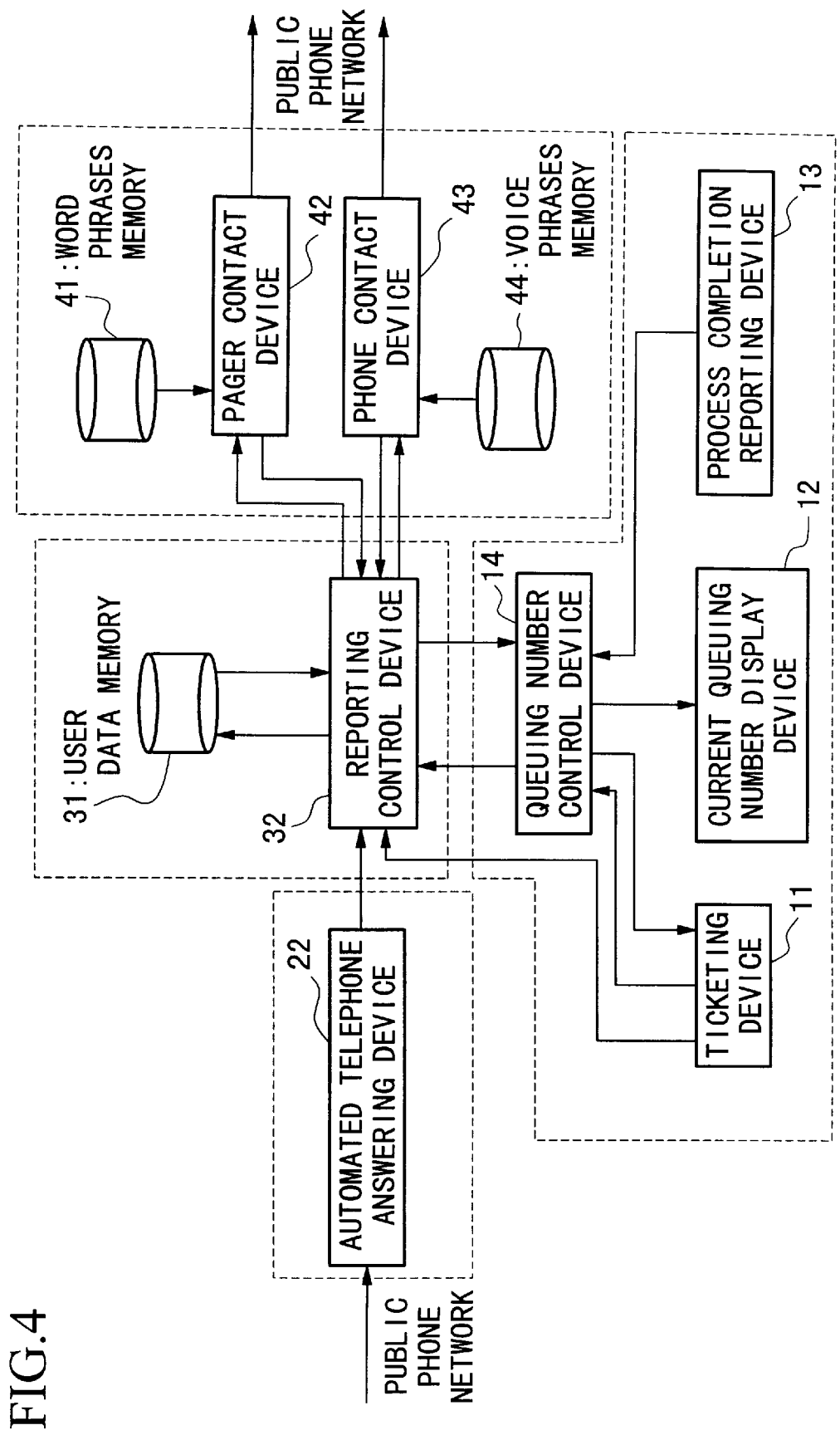
FIG. 4 is a block diagram of a third embodiment of the queuing status reporting apparatus of the present invention.

FIG. 4 shows a third embodiment of the queuing status reporting apparatus. The apparatus is the same as that shown in FIG. 1 except that the user data input device 21 (refer to FIG. 1) is integrated into the ticketing device 11. An example of the ticketing device 11 is shown in FIG. 5.

In this apparatus, the ticketing device 11 performs both tasks of issuing a queuing ticket and accepting the user data. Specifically, the ticketing device 11 obtains a next queuing number to be issued and the persons-in-queue from the queuing number control device 14, and outputs a signal to indicate that a queuing ticket has been issued, and forwards the user data (such as queuing number, contact number, and call-timing) to the reporting control device 32.

Combining these functions into one device encourages the users to take advantage of the call service to find out the queuing status. Such a service would be particularly attractive in amusement parks by relieving the users from the tedium of waiting for the queue spot and enabling the user to fully utilize the available time.

Embodiment 4

Figure 6:
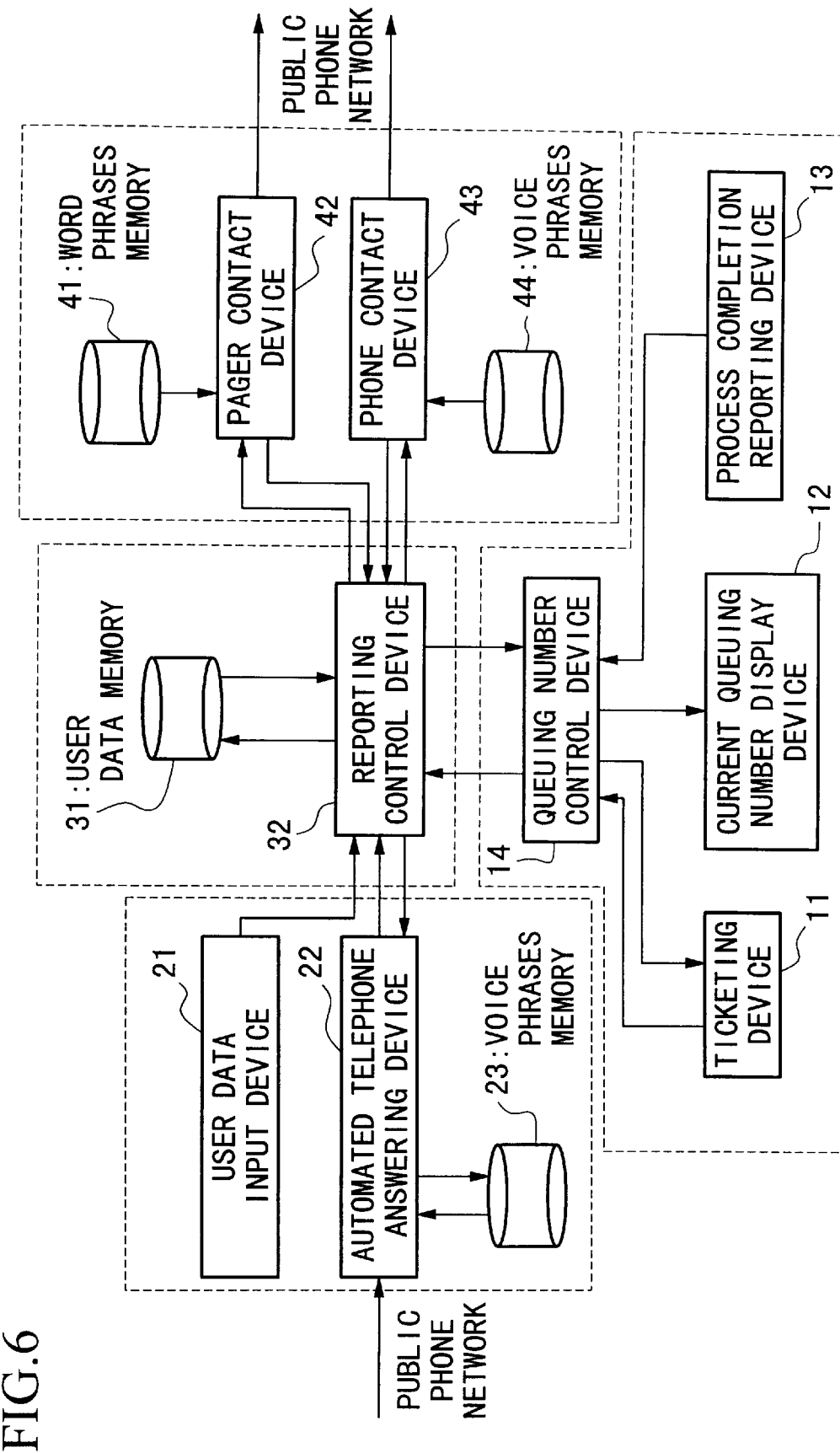
FIG. 6 is a block diagram of a fourth embodiment of the queuing status reporting apparatus of the present invention.

FIG. 6 shows a fourth embodiment of the queuing status reporting apparatus. The apparatus is the same as that shown in FIG. 1 except for the addition of a data flow path from the reporting control device 32 to the automated phone answering device 22, and the addition of a voice phrases memory 23 to the automated phone answering device 22.

The automated phone answering device 22 shown in FIG. 6 is capable of processing inquiries such as progress in queuing status and how much longer one must wait to be contacted. When the automated phone answering device 22 receives such an inquiry, the reporting control device 32 is so notified. The reporting control device 32 forwards a response to the automated phone answering device 22, which, based on the response, delivers an appropriate voice message stored in the voice phrases memory 23. This service can be realized by informing the user beforehand the number to call for such inquiries.

Embodiment 5

Figure 7:
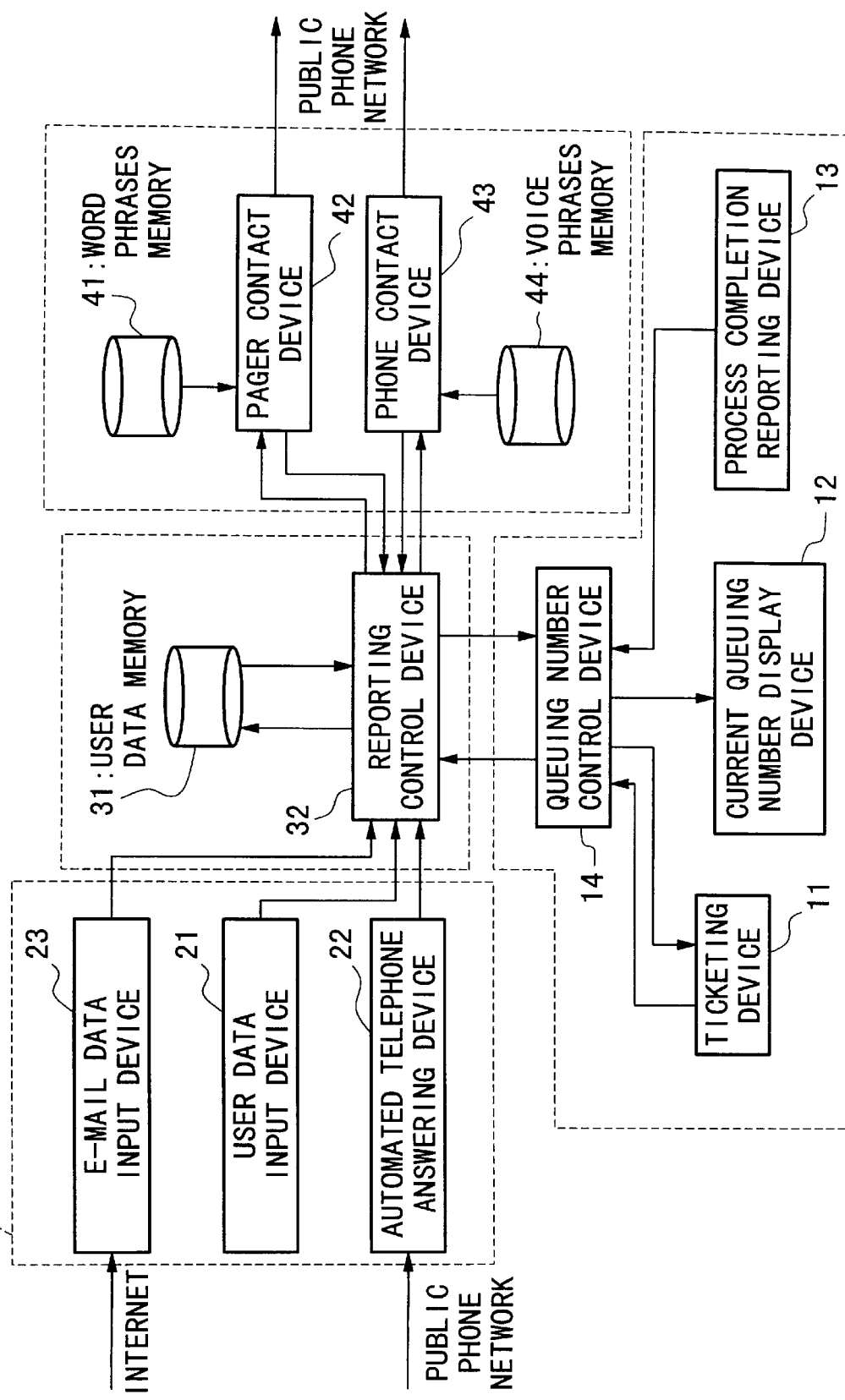
FIG. 7 is a block diagram of a fifth embodiment of the queuing status reporting apparatus of the present invention.

FIG. 7 shows a fifth embodiment of the queuing status reporting apparatus. This apparatus is the same as that shown in FIG. 1 except for the addition of an e-mail data input device 23 provided in the call-timing input section 2.

The e-mail data input device 45 may be connected directly to Internet or through a local service provider or an open computer network (OCN) and the like. When a call-request is received by e-mail, the user data (such as queuing number, contact number and call-timing) are identified from the e-mail. If all the items in the user data are identified, they are forwarded to the reporting control device 32, and the e-mail sender receives an acknowledgment. If the user data cannot be identified, a notice is sent to the e-mail sender to inform that the request cannot be processed due to lack of information.

This apparatus enables to add a call service to the telephone terminal so as to utilize the rapidly expanding services of e-mail communications.

Embodiment 6

Figure 8:
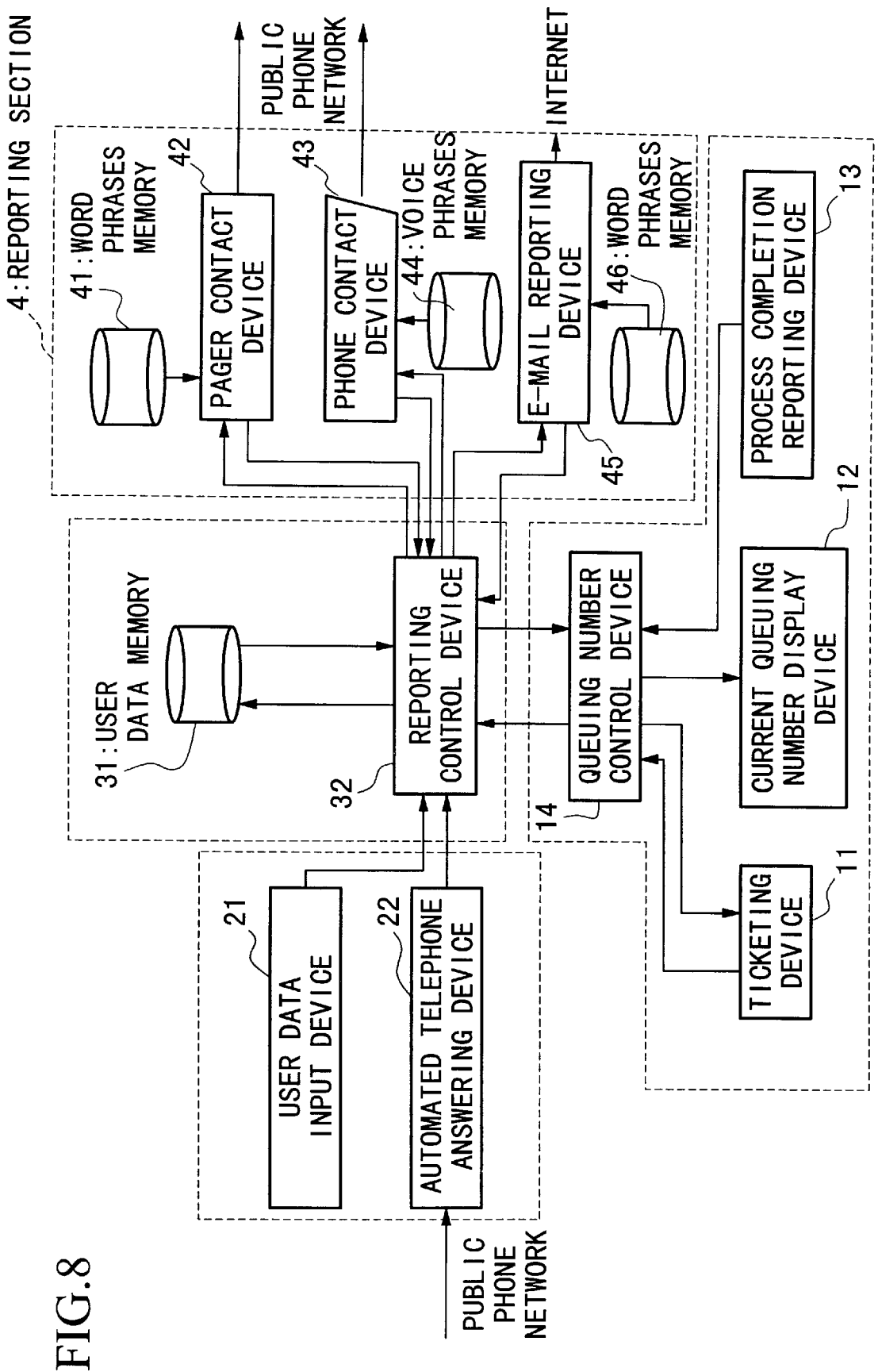
FIG. 8 is a block diagram of a sixth embodiment of the queuing status reporting apparatus of the present invention.

FIG. 8 shows a sixth embodiment of the queuing status reporting apparatus. The apparatus is the same as that shown in FIG. 1 except for the addition of an e-mail reporting device 45 and an e-mail word phrases memory 46 in the reporting section 4.

The e-mail reporting device 45 may be connected directly to Internet or through a local service provider or an open computer network (OCN) and the like. When a call-reserving user to be contacted by the reporting control device 32 is found, and if the contact number is an e-mail address, this e-mail address is forwarded to the e-mail reporting device 45. Upon receiving the e-mail address, the e-mail reporting device 45 selects a suitable phrase from the e-mail word phrases memory 46, as in the case of the paging receiver, and sends it to the address of the e-mail user. If the transmission is successful, the reporting control device 32 is so advised, and if the transmission is unsuccessful, the reporting device 32 is so advised. In the latter case, the reporting control device 32 will attempt re-contact in the near future (for example, 30 seconds).

The apparatus is thus able to report the status of a queuing line by e-mail to take advantage of this rapidly growing method of communication.

Embodiment 7

Figure 9:
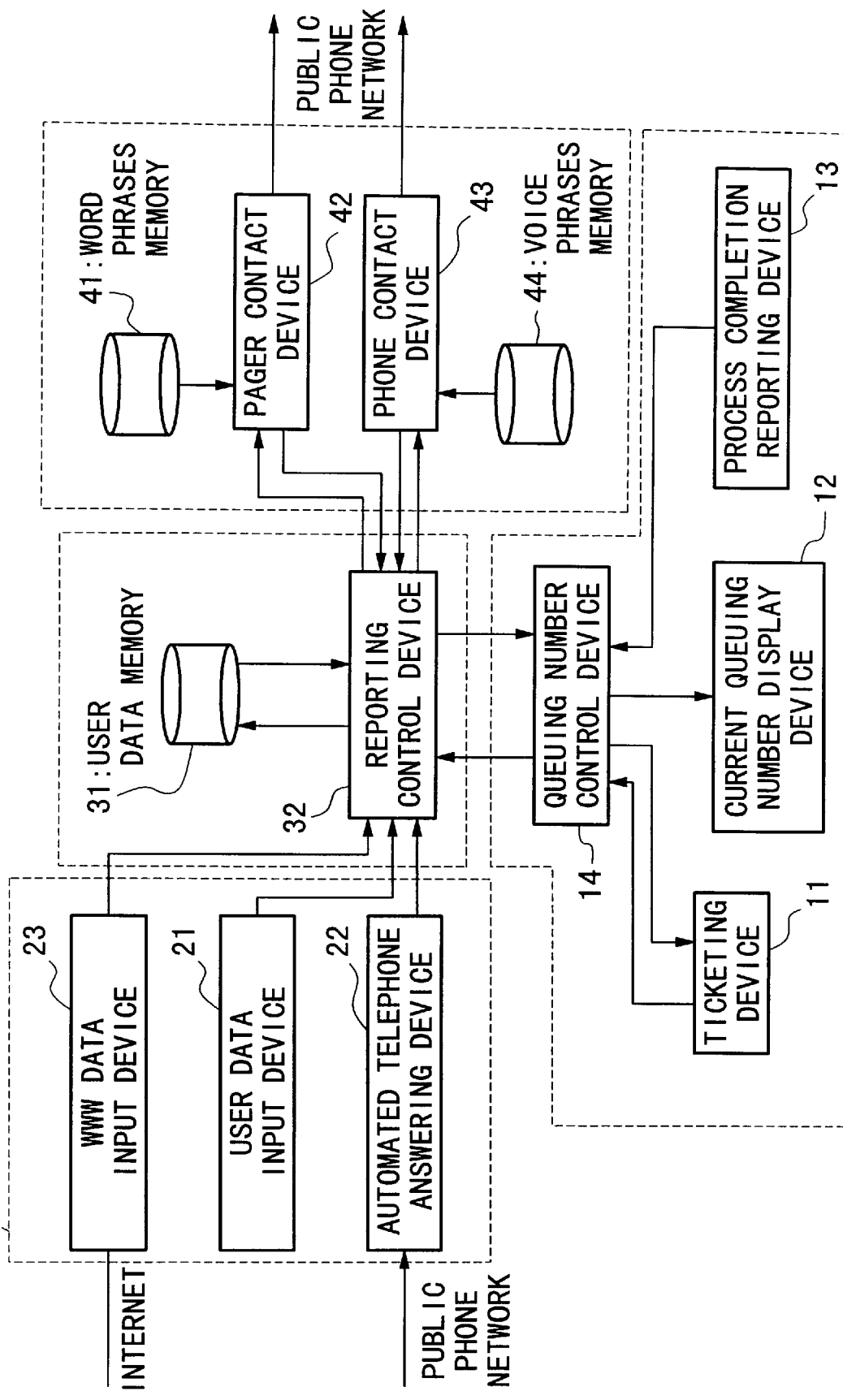
FIG. 9 is a block diagram of a seventh embodiment of the queuing status reporting apparatus of the present invention.

FIG. 9 shows a seventh embodiment of the queuing status reporting apparatus. The apparatus is the same as that shown in FIG. 1 except for the addition of a world wide web (WWW) data input device 23 provided in the call-timing input section 2.

The WWW data input device 23 may be connected directly to Internet or through a local service provider or an open computer network (OCN) and the like. The WWW data input device 23 is a WWW server, and its home page is prepared to accept call-request reservations. The user wishing to be contacted enters user data (such as queuing number, contact number, and call-timing) in the home page. When the WWW data input device 23 receives such user data, the user is so advised on the home page, and the user data are forwarded to the reporting control device 32. If the user data could not be received, the user is so advised on the home page.

In this apparatus, a call-request function is added to a telephone terminal/input pad to enable the apparatus to accept a call-request using this rapidly growing method of WWW communication.

Embodiment 8

Figure 10:
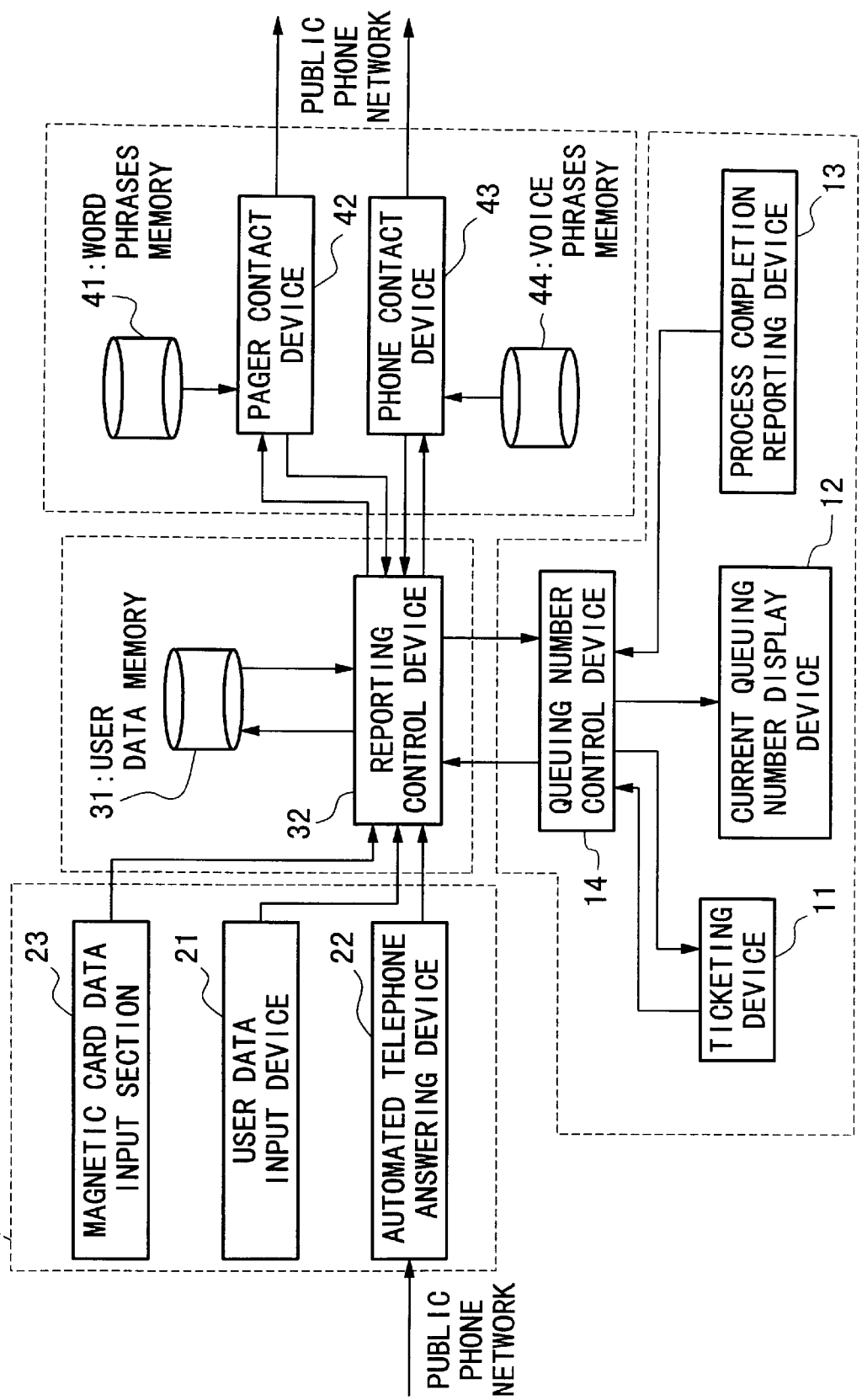
FIG. 10 is a block diagram of an eighth embodiment of the queuing status reporting apparatus of the present invention.

FIG. 10 shows an eighth embodiment of the queuing status reporting apparatus. The apparatus is the same as that shown in FIG. 1 except for the addition of a magnetic card input device 23 in the call-timing input section 2.

In this apparatus, the queuing number and call-timing are entered into the magnetic card input device 23 in the same manner as the user data input device 21, but the contact number is entered using a magnetic telephone card indicating the contact phone number. When the magnetic card input device 23 obtains all the user data, i.e., the queuing number, call-timing and contact number, the magnetic card input device 23 forwards the user data to the reporting control device 32.

If the recording section of the magnetic card has a read/write memory, a queuing number can also be recorded so as to save the effort of entering the queuing number.

The apparatus therefore enables not only to simplify contact procedure but also to prevent erroneous entry or data tampering by a third party. Instead of the magnetic card, integrated circuit card (IC card) may be used.

Embodiment 9

Figure 11:
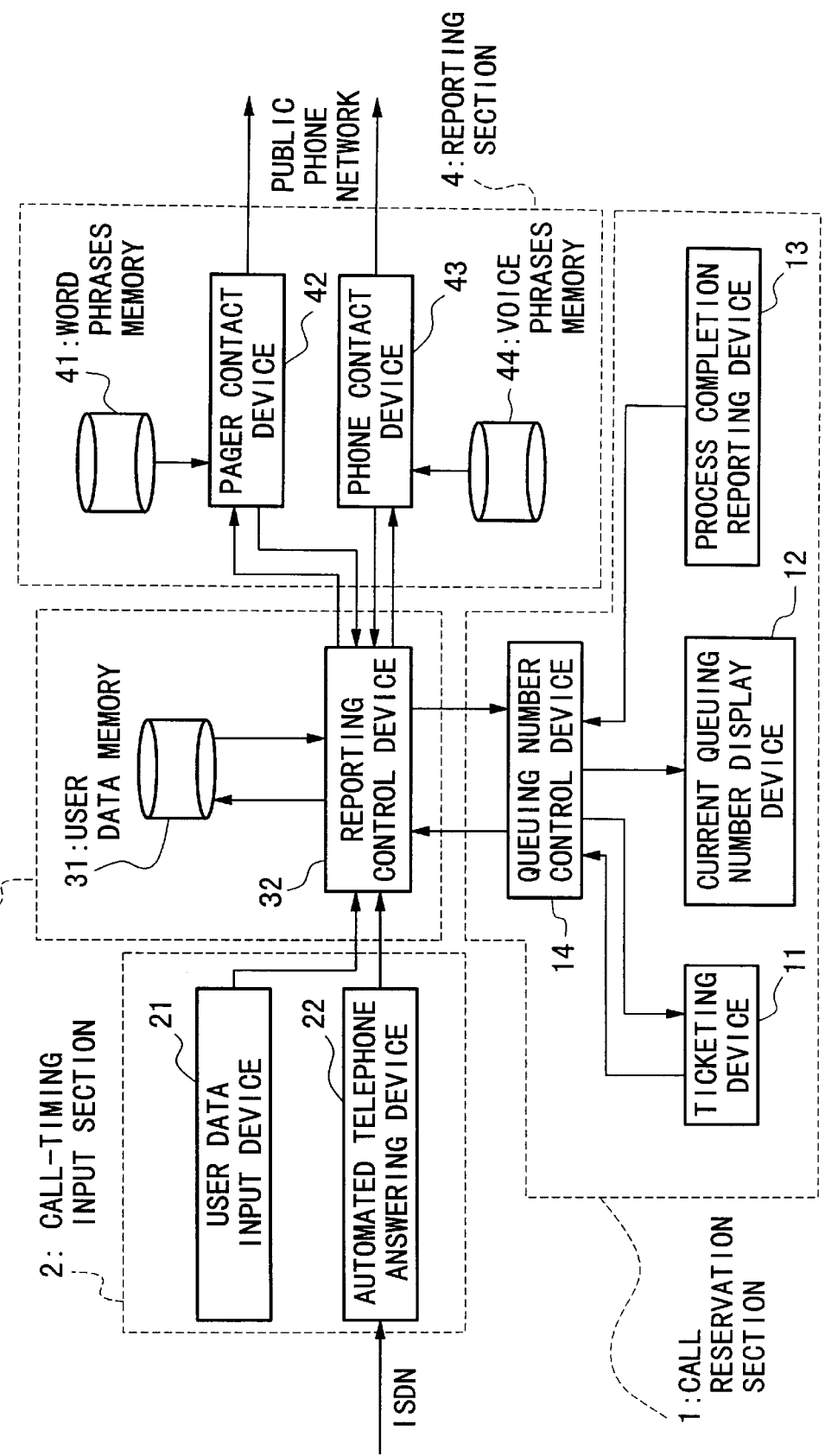
FIG. 11 is a block diagram of a ninth embodiment of the queuing status reporting apparatus of the present invention.

FIG. 11 shows a ninth embodiment of the queuing status reporting apparatus. The apparatus is the same as that shown in FIG. 1 except that the automated phone answering device 22 is connected to an integrated service digital network (ISDN).

Accordingly, when the automated phone answering device connected to an ISDN receives a call-request from a telephone, cell phone or PHS phone connected to ISDN, sender telephone number can be obtained directly. If the sender phone number is chosen to be the contact point, the sender phone number becomes the contact number. The queuing number and call-timing are entered in the same manner as the automated phone answering device 22.

The apparatus thus eliminates the need for inputting contact number to be called so that not only the data entry procedure is simplified but also data tampering by a third party can be prevented. Instead of using ISDN, "number display service" offered by NTT can be used also.

Variation 1

In FIG. 11, the algorithm in the reporting control device 32 may be improved so as to enable entry of not only persons-in-queue but a time-to-service.

In this case, the reporting control device 32 monitors changes in current queuing numbers to continually calculate the number of users being serviced per unit time. Based on the result, a time-based call-timing entered by a user can be converted to a person-based call-timing. Subsequent processing steps are the same as the case of normal call-request based on the persons-in-queue criterion.

The apparatus eliminates the need for the user to specify the number of preceding persons waiting according to a users' perception of processing speed at the service desk.

Variation 2

In FIG. 11, the algorithm for the reporting control device 32 may be improved to produce a periodic report of current status in queuing.

In this case, the call-timing input section 2 can accept input data specifying a time interval for periodic updating, such as "notify every time there are ten persons-in-queue" or "notify the user of a current queuing number every ten minutes". A reporting interval for the user is entered in the user data memory 31 in addition to the queuing number, contact number and call-timing. Upon receiving a current queuing number from the queuing number control device 14, the reporting control device 32 searches for users requiring current status reporting in addition to those call-due users. If a user requesting current-status reporting is found, the current status report is transmitted using the same procedure as the call-due users. In this case, the reporting control device 32 transmits the current status as well as the contact number to the reporting section 4.

The apparatus thus enables the users away from the service desk to understand the status of queuing at regular intervals.

Embodiment 10

Figure 12:
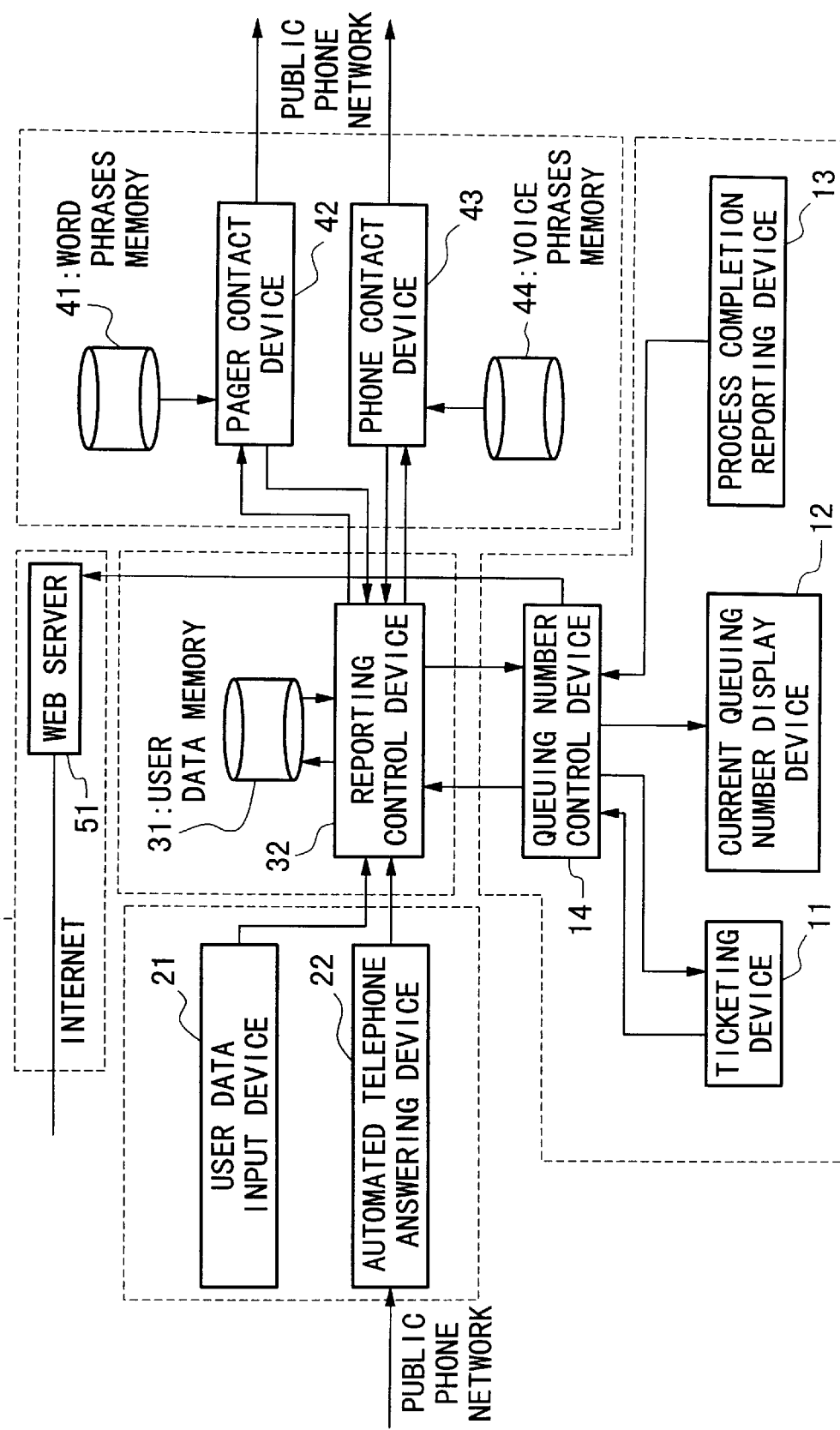
FIG. 12 is a block diagram of a tenth embodiment of the queuing status reporting apparatus of the present invention.
Figure 13:
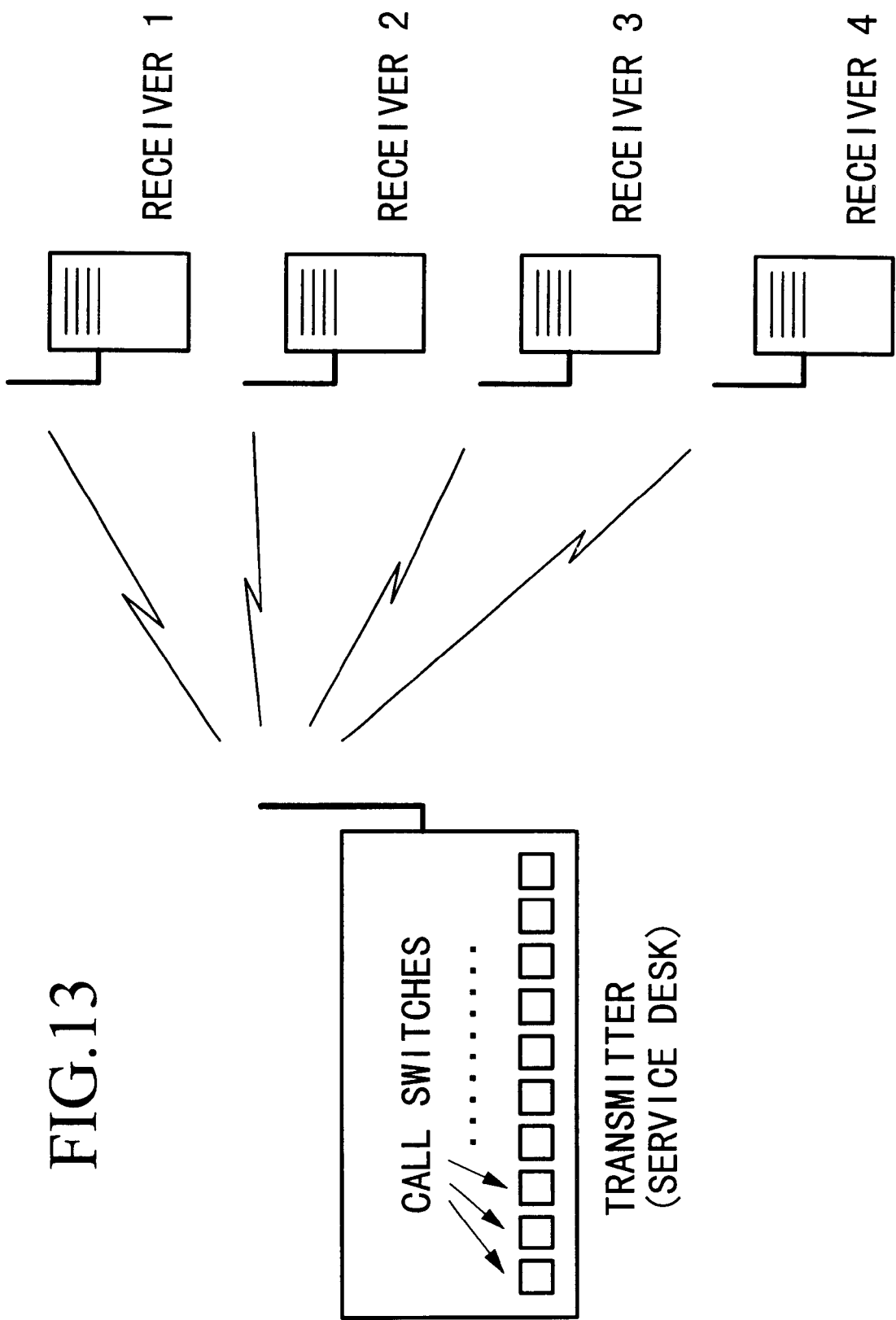
FIG. 13 is a block diagram of a conventional customer notification system.

FIG. 12 shows a tenth embodiment of the queuing status reporting apparatus. The apparatus is the same as that shown in FIG. 1 except for the addition of a current status reporting section 5.

The current status reporting section 5 is comprised by a web server 51, which constantly receives current queuing state and the value of a counter storing the queuing number currently being serviced from the queuing number control device 32. Based on such information, a web page displays queuing data such as the queuing number currently being serviced and a list of persons-in-queue as well as the information on time-to-service and the number of preceding persons to service time.

The apparatus is thus able to inform the users about the current state of progress in queuing, persons-in-queue and time-to-service or preceding persons to service time through the web page.

What is claimed is:

1. A queuing status reporting apparatus for delivering a report to a call-reserving user in a queuing line by calling a paging receiver or a telephone device specified by said call-reserving user, comprising:

a user data memory for storing a pager receiver number or a telephone number as a contact number relating to each call-reserving user, and a call-timing as a schedule for contacting each call-reserving user;

a reporting control device connected to said user data memory for searching through call-timing data to detect a call-due user, and if a call-due user is found, to access a relevant contact number from said user data memory, and to decide whether said relevant contact number is a paging receiver number or a telephone number;

a pager contact device connected to said reporting control device for delivering a word-report to a paging receiver, when said relevant contact number obtained by said reporting control device is judged to be a paging receiver; and a phone contact device connected to said reporting control device for delivering a voice-report to a telephone device, when said detected contact number obtained by said reporting control device is judged to be a telephone device.

2. An apparatus according to claim 1, wherein said apparatus is further provided with:

a word phrases memory for storing model word phrases; and a voice phrases memory for storing model voice phrases; and wherein said pager contact device is also connected to said word phrases memory, and performs a task of reporting by using a word phrase selected from said word phrases memory when said reporting control device decides that a contact number is associated with a paging receiver; and said phone contact device is also connected to said voice phrases memory, and performs a task of reporting by using a voice phrase selected from said voice phrases memory when said reporting control device decides that a contact number is associated with a telephone device.

3. An apparatus according to claim 1, wherein said apparatus is further provided with a ticketing device for issuing a queuing ticket to a call-reserving user; and a user data input device for entering user data comprised by a queuing number as an identifier for said call-reserving user, a contact number and a call-timing into said user data memory.

4. An apparatus according to claim 1, wherein said apparatus is further provided with a ticketing device for issuing a queuing ticket to a call-reserving user; and an automated phone answering device for automatically responding to a queuing number, a contact number and a call-timing entered by said call-reserving user through a telephone circuit, and for inputting said queuing number as an identifier for said call-reserving user, said contact number and said call-timing into said user data memory.

5. An apparatus according to claim 4, wherein, in response to receiving a queue spot cancel notice sent through a telephone circuit by a call-reserving user, said automated phone answering device automatically deletes a queuing number, specified in said queue spot cancel notice, as well as corresponding contact number and call-timing from said user data memory.

6. An apparatus according to claim 4, wherein, in response to receiving a queue spot postponing notice sent through a telephone circuit by a call-reserving user, said automated phone answering device automatically revises an original call-timing, associated with a queuing number shown in said queue spot postponing request, to conform to a new call-timing specified in said queue spot postponing request.

7. An apparatus according to claim 1, wherein said user data memory further stores an e-mail address as a contact number for identifying a call-reserving user, and a call-timing as a schedule to deliver a report, and said reporting control device searches through call-timing data in said user data memory, and when a call-due user is found, said reporting control device accesses a relevant contact number from said user data memory, and determines whether a detected contact number is associated with a paging receiver, a telephone number or an e-mail address; and said apparatus is further provided with an e-mail reporting device (45) connected to said reporting control device so that, when said reporting control device determines that said relevant contact number is associated with an e-mail address, a word-report is sent to said email address.

8. An apparatus according to claim 7, wherein said apparatus is further provided with an e-mail model phrases memory for storing model e-mail phrases, and said e-mail reporting device is also connected to said e-mail model phrases memory so that, when said reporting control device determines that said relevant contact number is associated with an e-mail address, a report is sent to said e-mail address using a model phrase selected from said e-mail model phrases memory.

9. An apparatus according to one of claims 1, wherein said telephone device includes an analogue phone, a digital phone, and a phone connected to a wired network.

* * * * *